(12) United States Patent
Zimmer et al.

(10) Patent No.: US 7,363,482 B2
(45) Date of Patent: Apr. 22, 2008

(54) METHOD AND APPARATUS TO SUPPORT REMOTE CONFIGURATION CODE

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 10/794,690

(22) Filed: Mar. 3, 2004

(65) Prior Publication Data

US 2005/0198487 A1  Sep. 8, 2005

(51) Int. Cl.
*G06F 9/00* (2006.01)
(52) U.S. Cl. .................. 713/2; 713/1; 713/100
(58) Field of Classification Search ............ 713/1, 713/2, 100
See application file for complete search history.

(56) References Cited

U.S. PATENT DOCUMENTS

| | | | | | |
|---|---|---|---|---|---|
| 5,349,643 | A | * | 9/1994 | Cox et al. | 713/155 |
| 6,732,267 | B1 | * | 5/2004 | Wu et al. | 713/100 |
| 6,816,963 | B1 | * | 11/2004 | Krithivas et al. | 713/1 |
| 7,007,158 | B1 | * | 2/2006 | Mahmoud | 713/1 |
| 7,024,474 | B2 | * | 4/2006 | Clubb et al. | 709/223 |
| 2002/0069192 | A1 | * | 6/2002 | Aegerter | 707/1 |
| 2003/0110369 | A1 | * | 6/2003 | Fish et al. | 713/1 |
| 2004/0148596 | A1 | * | 7/2004 | Watson et al. | 717/168 |
| 2004/0205329 | A1 | * | 10/2004 | Wu et al. | 713/2 |
| 2004/0230963 | A1 | * | 11/2004 | Rothman et al. | 717/168 |
| 2004/0252326 | A1 | * | 12/2004 | Bukowski et al. | 358/1.15 |
| 2005/0076196 | A1 | * | 4/2005 | Zimmer et al. | 713/1 |
| 2005/0136939 | A1 | * | 6/2005 | Mountain et al. | 455/453 |
| 2005/0160257 | A1 | * | 7/2005 | Kruger et al. | 713/2 |
| 2005/0172230 | A1 | * | 8/2005 | Burk et al. | 715/716 |

OTHER PUBLICATIONS

U.S. Patent Application, pending, filed Feb. 20, 2004 to Michael D. Kinney, (copy enclosed).
Greg McGrath, Intel Developer Forum, "EFI Byte Code Driver Development", Feb. 25-28, 2002.
Mark Doran, Intel Developer Forum, "From Research and Development at Intel: Beyond the Bios", Feb. 18, 2003.
Harry Hsiung, Intel Developer Forum, "EFI Driver's Writers Guide", Feb. 19, 2003.
Matthew Tolentino of Intel Corp., Proceedings of the Linux Symposium, "Linux in a Brave New Firmware Environment", Jul. 23-26, 2003, Ottawa, Canada.
Brian Richardson, Intel Developer Forum, "Bios Compatibility Within the Intel Platform Innovation Framework for EFI", Sep. 17, 2003.
Intel, "Extendible Firmware Interface Specification", Version 1.10, Dec. 1, 2002.

* cited by examiner

*Primary Examiner*—Thomas Lee
*Assistant Examiner*—Malcolm D Cribbs
(74) *Attorney, Agent, or Firm*—Michael R. Barre

(57) ABSTRACT

A method and related apparatuses involve extensible framework interface (EFI) byte code images packaged within extensible markup language (XML) documents. In one embodiment, a processing system obtains an XML document, extracts an EFI byte code (EBC) image from the XML document, and then executes the EBC image. For instance, such a process may be used to obtain configuration code such as an EFI driver from a remote system. Processes are disclosed for retrieving and loading configuration code in pre-boot and runtime environments. Additional embodiments relate to XML files containing EBC images, processing systems that use EBC images from XML documents as configuration code, and processing system that provide XML documents with EBC images to other processing systems. Other embodiments are described and claimed.

11 Claims, 5 Drawing Sheets

METHOD AND APPARATUS TO SUPPORT REMOTE CONFIGURATION CODE

FIELD OF THE INVENTION

The present disclosure relates generally to the field of data processing, and more particularly to a method and related apparatuses for supporting remote configuration code.

BACKGROUND

In a typical legacy data processing system, firmware provides the machine instructions that control the system when the system is being powered up or has been reset, but before an operating system (OS) is booted. That is, the firmware controls the pre-OS boot operations. Those boot operations may include a power-on self test (POST) of certain system components, as well as discovery and configuration of additional system components. The firmware may also control certain operations after the OS has been loaded, such as operations for handling certain hardware events and/or system interrupts. The firmware thus provides an interface between the hardware components of the system and software components such as the OS.

The firmware may handle boot and post-boot operations through a set of routines referred to collectively as a basic input/output system (BIOS). The firmware in a legacy data processing system may include BIOS instructions stored in system read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. The firmware may also include device drivers or other configuration code stored in ROM associated with particular components. For example, an adapter card for a video controller may include ROM with configuration code for the video controller. ROM with configuration code for an optional component of a data processing system may be referred to as an option ROM. Thus, when a legacy data processing system is started, the system obtains its firmware from local components, such as system ROM and option ROM.

In addition, a model for an interface between platform firmware and higher-level software such as operating systems was recently announced. That model is known as the Extensible Firmware Interface (EFI). Version 1.10 of the EFI Specification, dated Dec. 1, 2002, may be obtained from www.intel.com/technology/efi/main specification.htm. The EFI specification defines a set of standard interfaces and structures to be provided by low-level platform firmware, for use in loading additional firmware and booting the OS. Platform frameworks based on the EFI model, such as the Intel® Platform Innovation Framework for EFI, are expected to supplant frameworks based on the BIOS model within the next few years as the frameworks of choice for designing, building, and operating data processing systems. The Intel® Platform Innovation Framework for EFI includes low-level firmware which provides boot and runtime service calls that are available to the operating system and its loader. Since the Intel® Platform Innovation Framework for EFI comports with the EFI specification, the core services of that framework provide a standard environment for operations such as loading firmware drivers, running pre-OS applications, and booting an OS.

Under the EFI model, firmware drivers and pre-OS applications should be formatted according to the portable executable (PE) format. The PE format is the file format that Microsoft Corporation adopted as the standard format to be used for executable files to run under operating systems such as Microsoft® Windows® NT, Microsoft® Windows® XP, Microsoft® Windows® 2000, and Microsoft Windows CE®. The term "portable executable" reflects an intention to provide a common format for executable files for multiple operating systems. Linkers from vendors such as Microsoft® can be used to generate executable files in the PE format from object files in the Common Object File Format (COFF). The PE format is described in revision 6.0 of the "Microsoft Portable Executable and Common Object File Format Specification," dated February 1999 (the "PE/COFF Specification"), available at www.microsoft.com/hwdev/download/hardware/PECOFF.doc.

A developer may build an executable image of an EFI driver for a certain native architecture, such as an IA-32 architecture or an Intel® Itanium®) architecture. Alternatively, the developer may build an executable image of the EFI driver as an EFI byte code (EBC) image. One EBC image may run on multiple platforms and architectures, including both Itanium®-based and IA-32 processor architectures, provided those platforms comport with version 1.10 (or later) of the EFI 1.10 specification. Consequently, a manufacturer may produce a device that is suitable for use with multiple different architectures by populating the device's option ROM with an EBC image of a driver for the device.

Nevertheless, under both the BIOS and EFI models of platform configuration, ROM has provided the transport for configuration code such as driver images. Unfortunately, the cost of required option ROMs adds to the cost of components such as adapter cards. It is also typically difficult or impractical to update configuration code in a data processing system. For instance, to update configuration code such as an EBC image, it may be necessary (a) to reboot to a rudimentary operating environment such as a disk operating system (DOS) environment, (b) to then flash the new code image into ROM from the DOS environment, and (c) to then reboot again, to activate the system with the new image.

BRIEF DESCRIPTION OF THE DRAWINGS

The features and advantages of the present invention will become apparent from the appended claims and the following detailed description of one or more example embodiments, in which:

DETAILED DESCRIPTION

The present disclosure describes one or more example embodiments of methods and apparatuses which may reduce or eliminate the dependence on local non-volatile storage as the repository for configuration code such as EBC images needed by a data processing system. In one embodiment, EBC images are made available over a local area network (LAN) or a wide area network (WAN) such as the Internet, and individual data processing systems may dynamically obtain EBC images from the network as needed.

Figure 4:
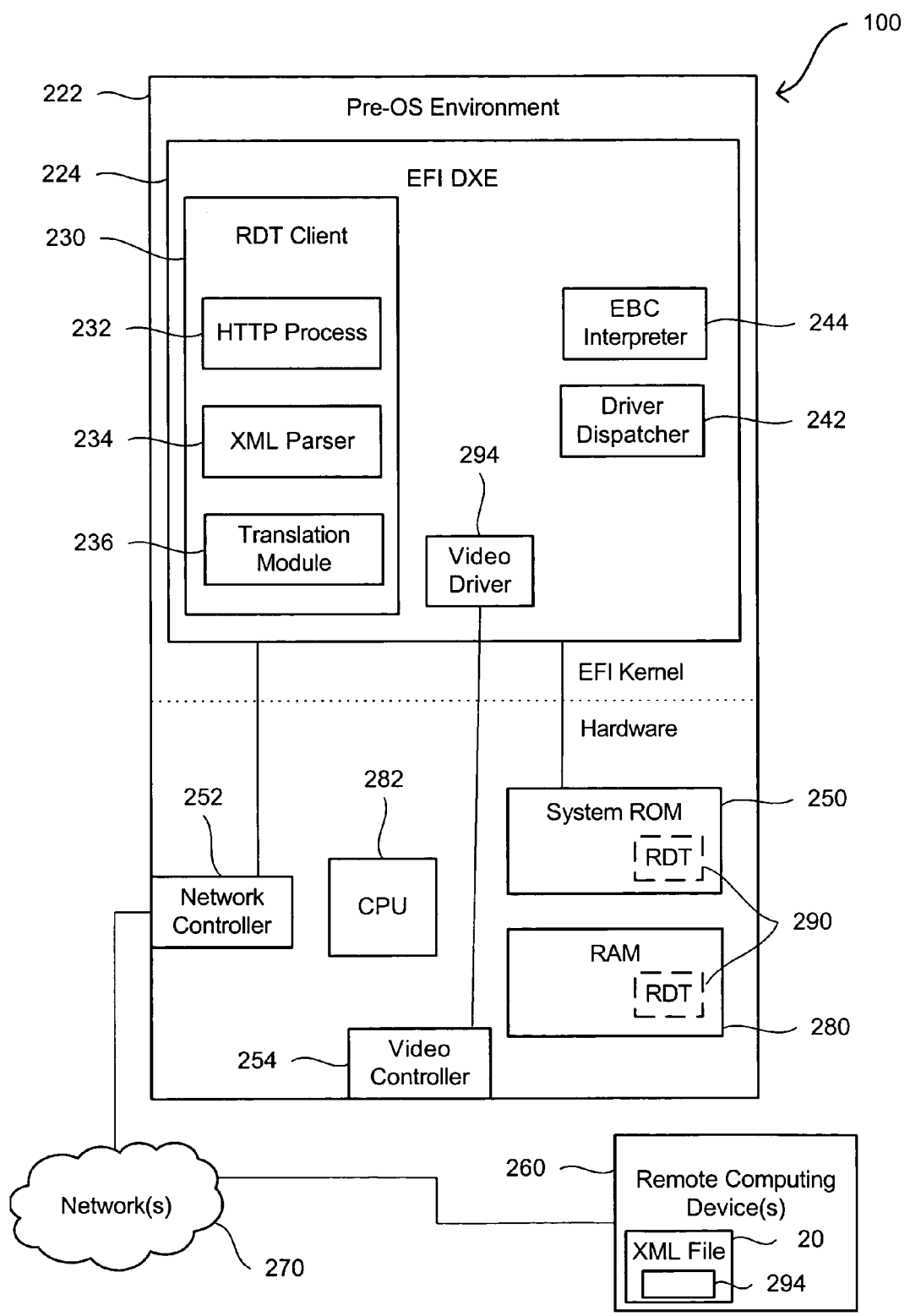
FIG. 4 is a block diagram depicting an example embodiment of a suitable data processing environment in which certain aspects of the invention may be implemented.
Figure 5:
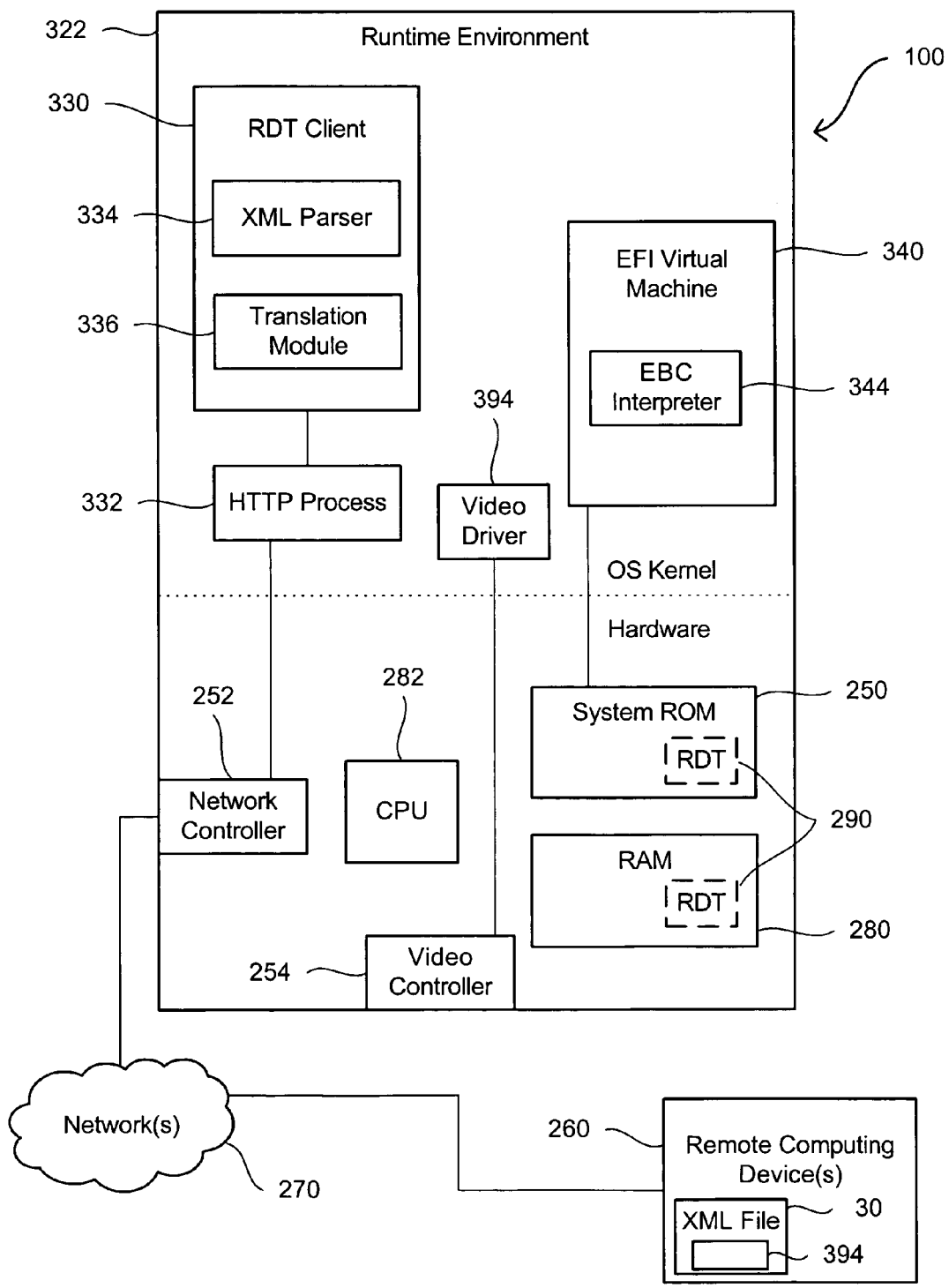
FIG. 5 is a block diagram depicting another example embodiment of a suitable data processing environment in which certain aspects of the invention may be implemented.

For instance, a developer may use base64 encoding or any other suitable text-based encoding to convert a driver's EBC image into an American Standard Code for Information Interchange (ASCII) text string or any other suitable text string. The developer may then encapsulate that text string into an XML document, and may make that XML document available on a central server. For example, FIGS. 4 and 5 depict XML documents 20 and 30 containing base64 encodings of EBC driver images 294 and 394. When a target data processing system needs such an EBC image, the target system may retrieve the XML document from the central server, and may use the EBC image from the XML document to configure a corresponding component of the target system, as described in greater detail below.

Figure 1:
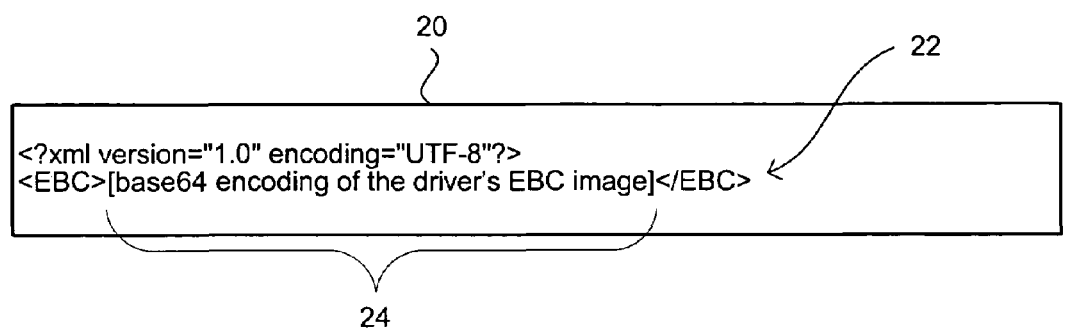
FIG. 1 is a block diagram illustrating an extensible markup language (XML) document that includes an EFI byte code (EBC) driver according to an example embodiment of the present invention.

FIG. 1 depicts an XML document 20 which includes an element 22 with a predetermined tag for identifying an EBC image. In the illustrated embodiment, the tag <EBC> is used for that purpose. As represented by the text in square brackets, the content 24 of <EBC> element 22 is a base64 encoding of an EBC image for configuration code such as a display driver. For purposes of this disclosure, the term "driver element" refers in general to an element of an XML document that contains configuration code, such as an EFI driver, for example.

Figure 2:
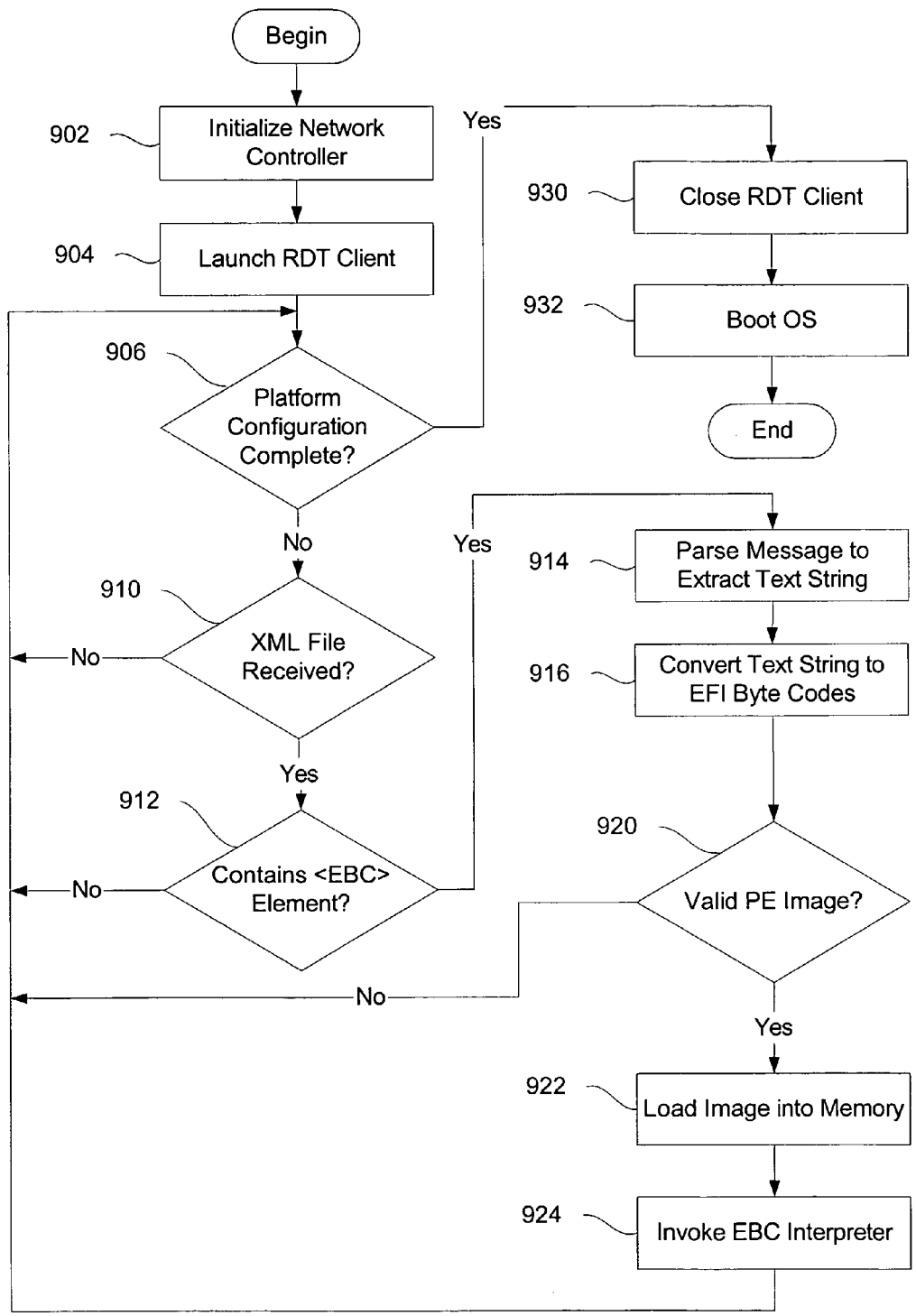
FIG. 2 is a flowchart illustrating a process to support remote configuration code, in accordance with one embodiment of the present invention.

FIG. 2 is a flowchart illustrating a process to utilize remote configuration code, in accordance with one embodiment of the present invention. The process of FIG. 2 relates to using remote configuration code in a pre-OS environment. That process is described with regard also to FIG. 4.

FIG. 4 and the following discussion are intended to provide a brief, general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, mini-computers, client-server systems, personal computers, workstations, servers, portable computers, laptop computers, tablets, telephones, personal digital assistants (PDAs), handheld devices, and other devices for processing or transmitting information.

The data processing environment of FIG. 4, for example, may include a local or target processing system 100 that includes one or more processors or central processing units (CPUs) 282 communicatively coupled to various other components via one or more system buses or other communication conduits. Such components may include one or more volatile or non-volatile data storage devices, such as ROM 250, random access memory (RAM) 280, mass storage devices such hard disk drives, and/or other devices or media, such as floppy-disks, optical storage, tapes, flash memory, memory sticks, digital video disks, biological storage, etc. The components coupled to processor 282 in local system 100 may also include one or more video interfaces or controllers 254 and one or more network interfaces or controllers 252.

Some components, such as video controller 254 for example, may be implemented as adapter cards with interfaces, such as a peripheral connect interface (PCI) connector, for communicating with a system bus. Some components, such as network controller 252 for example, may include ROM that contains the configuration code needed by local system 100 to configure those components. Other components, such as video controller 254 for instance, may contain only a subset of the required configuration code, or no configuration code at all.

Processing system 100 may be controlled, at least in part, by input from conventional input devices, such as keyboards, mice, etc., and/or by directives received from another machine, interaction with a virtual reality (VR) environment, biometric feedback, or other input sources or signals. Processing system 100 may include embedded controllers, such as programmable or non-programmable logic devices or arrays, application-specific integrated circuits (ASICs), embedded computers, smart cards, and the like. Processing system 100 may utilize one or more connections to one or more remote systems 260, such as through network controller 252, through a modem, or through another communicative coupling. Processing systems may be interconnected by way of a physical and/or logical network 270, such as a local area network (LAN), a wide area network (WAN), an intranet, the Internet, etc. Communications involving network 270 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be stored in volatile and/or non-volatile data storage.

For instance, in the illustrated embodiment, ROM 250 includes one or more instruction sets 290 for supporting platform configuration with remote drivers or other remote configuration code. During platform initialization, those instructions may be copied to RAM 280. In the example embodiment, those instructions may be referred to in general as a remote driver transport (RDT) 290. In alternative embodiments, processing system 100 may receive RDT 290 from any suitable source, including without limitation from other data storage devices within processing system 100 or from one or more remote sources, such as remote system 260 for example.

In the embodiment of FIG. 4, processing system 100 may use the Intel® Platform Innovation Framework for EFI. That framework provides distinct boot and runtime execution environments. Within the boot environment, the Intel® Platform Innovation Framework for EFI provides a class of services known as boot services. The boot services include various interfaces and protocols that provide an OS loader with access to platform capabilities required to complete OS boot. The boot services are also available to drivers and applications that need access to platform capability. In general, the boot environment and thus the boot services are terminated once the operating system takes control of the platform. Within the runtime environment, the Intel® Platform Innovation Framework for EFI provides a class of services known as runtime services. The runtime services include interfaces that provide access to underlying platform-specific hardware that may be useful during OS runtime, such as timers. The runtime services are available during the boot process, but also persist after the OS loader terminates boot services.

The EFI specification also provides for a variety of different types of executable images that may be loaded and executed within the boot environment. Those image types include EFI applications, EFI drivers, and EFI OS loaders. An EFI application is modular code that may be loaded in the boot environment to accomplish platform-specific tasks within that environment. Examples of possible EFI applications include platform specific firmware features, utilities, diagnostics, and disaster recovery tools shipped with a platform to run outside the OS environment.

The process of FIG. 2 may begin with local system 100 performing boot operations in a pre-OS or boot environment 222, for example in response to being powered on or reset. In the example embodiment, the process of FIG. 2 begins after processing system 100 has instantiated an EFI driver execution environment (DXE) 224. At block 902, processing system 100 initializes network controller 252. In the example embodiment, CPU 282 obtains the configuration code to initialize network controller 252 from a local source, such as ROM 250 or a ROM module included in or otherwise associated specifically with network controller 252. As shown at block 904, processing system 100 may then instantiate within DXE 224 any code or constructs needed to support network communications, such as a hypertext transfer protocol (HTTP) process 232. In the example embodiment, such code is represented by an RDT client 230. RDT client 230 may be implemented as one or more EFI applications, for example. RDT client 230 may include an XML parser 234 for extracting EBC content from XML documents, and a translation module 236 for converting that EBC content into a desired format, as described in greater detail below. In the example embodiment, CPU 282 obtains the code for supporting network communications from a local source, such as ROM 250 or a hard disk drive, for example.

At block 906, processing system 100 determines whether platform configuration is complete. For example, processing system 100 may determine that platform configuration is complete if all components have been initialized. If platform configuration is complete, the process of FIG. 2 may end with processing system 100 closing RDT client 230 and calling a boot loader for the OS, as depicted at blocks 930 and 932.

If platform configuration is not complete, however, the process may pass from block 906 to block 910, with processing system 100 determining whether RDT client 230 has received an XML file, also known as an XML document. For example, the firmware may listen for HTTP POST requests on port 80 in order to receive some XML pages sent from a manageability console. The firmware may do so from its setup menu or other pre-OS manageability interface. If an XML file has not been received, the process may return to block 906. However, if an XML file has been received, processing system 100 may use XML parser 234 to determine whether that file contains an element associated with remote configuration code, such as an <EBC> element. If the XML file contains no <EBC> element, the process may return to block 906. Otherwise, processing system 100 may use XML parser 234 and translation module 236 to extract the content of the <EBC> element and translate that text string into a binary image, as shown at blocks 914 and 916. The binary image may be referred to as an EBC image.

Processing system 100 may then use a driver dispatcher 242 to determine whether the EBC image is a valid PE image, as indicated at block 920. If that determination is negative, the process may return to block 906. However, if the EBC image is a valid PE image, processing system may load the EBC image into an appropriate portion of RAM 280 and invoke an EBC interpreter 244 to interpret and execute the configuration code within the EBC image, as show at block 922 and 924. For instance, processing system 100 may invoke EBC interpreter by calling the driver entry point for the EBC driver. Once the driver entry point has been called, the driver may be considered loaded, instantiated, or executed. The process may then return to block 906, with various operations being reiterated as appropriate until platform configuration is complete.

Thus, if processing system 100 receives, for example, an XML file with a driver for video controller 254, processing system 100 may instantiate within DXE 224 a video driver 294 based on that XML file, using the process described above. Such a process may be used to download device-specific configuration code from a remote system. For example, a hardware vendor such as ATI Technologies Inc. could distribute video cards with very small or no option ROMs, and when such a card is installed in a system, the system could automatically obtain the proper driver for that card from the vendor's website, instead of from a video option ROM. The cost of manufacturing components such as video cards could therefore be reduced. In addition, the end user could be assured of having the latest available driver, and would not be required to flash any ROM to install driver updates. The hardware vendor could also save development costs by developing silicon drivers and fixes/hot patches once, in EBC, for any OS and any pre-OS environment.

One example of the types of configuration code that processing system 100 can obtained from an XML document is a universal graphics adapter (UGA) driver 294. After loading UGA driver 294, processing system 100 could use UGA driver 294 to set the mode of video controller 254 as desired, such as to a resolution of 640 by 480 for instance.

For purposes of this disclosure, the term "configuration code" may include EFI drivers and OS drivers. An EFI driver is generally a module of code that is inserted into the boot environment via EFI boot or runtime services or protocols. For example, an EFI driver may be inserted into the boot services environment of a system that features the Intel® Platform Innovation Framework for EFI. Alternatively, an EFI or OS driver may be inserted into an EFI virtual machine (VM) environment. An EFI VM environment may emulate a boot services environment during the OS runtime. EFI drivers may provide device support during the boot process and they may provide platform services. Examples of possible EFI drivers may include central processing unit (CPU) drivers, chipset drivers, UGA drivers, etc.

An OS driver is generally a module that is loaded after the OS takes control, and without use of an EFI VM, to provide device support after the OS takes control of the platform. The present disclosure relates to a process for loading EFI drivers, OS drivers, or both. For instance, EFI drivers may be loaded into and operate within a pre-OS boot services regime. In addition, in EFI drivers may be loaded into and operate within a runtime environment with OS-emulated boot services via an EFI VM.

Figure 3:
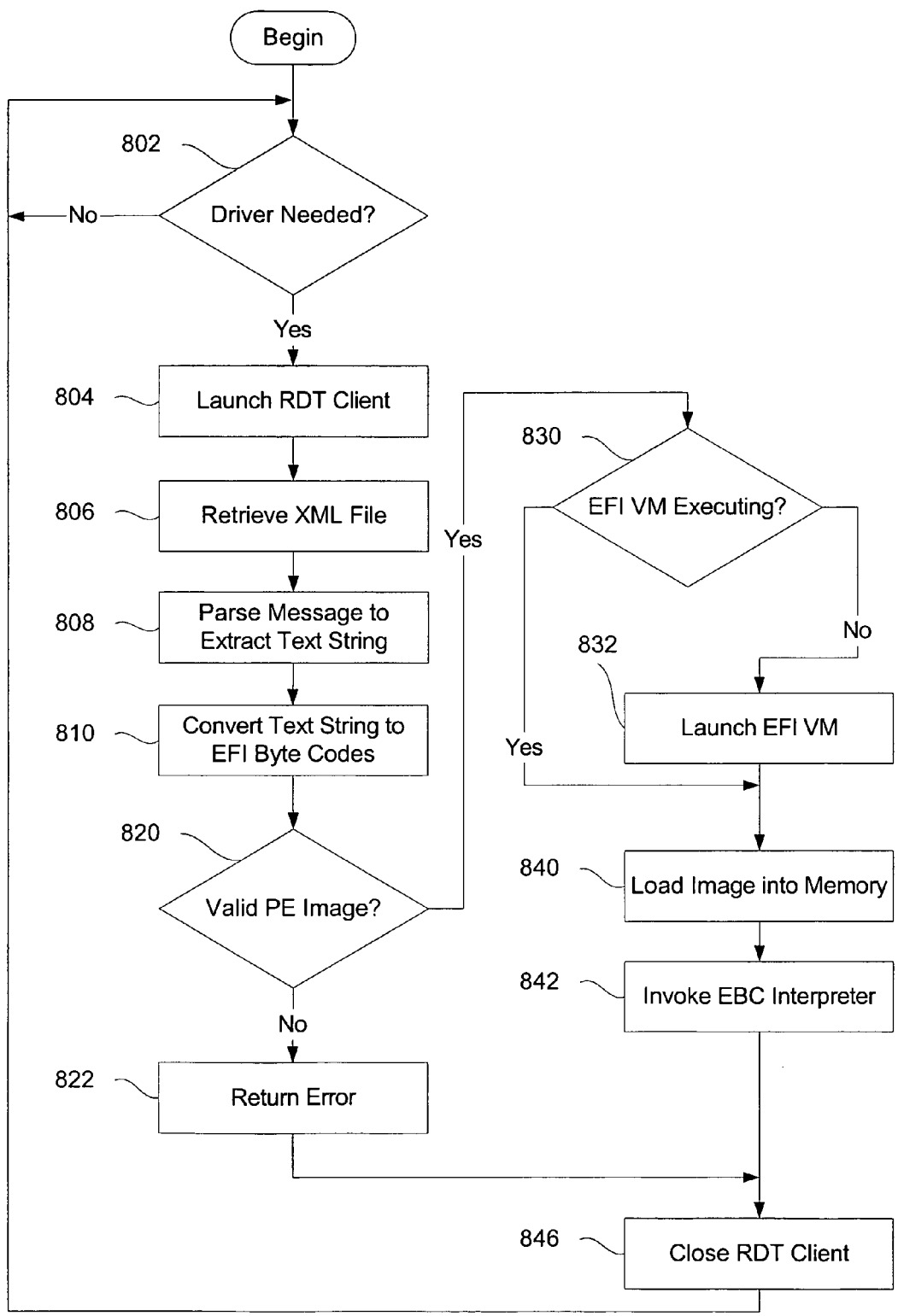
FIG. 3 is a flowchart illustrating a process to support remote configuration code, in accordance with another embodiment of the present invention.

FIG. 3 is a flowchart illustrating an example embodiment of a process to support remote configuration code in connection with a post-boot or OS runtime environment. The example process if FIG. 3 is described with regard also to FIG. 5, which depicts a runtime environment 322 of processing system 100. An OS in processing system 100 may have created runtime environment 322 after a boot process has been completed and an OS loaded. As shown at block 802, in the illustrated process, the OS may determine whether processing system 100 lacks a driver that is needed. This determination may be made in response to the OS discovering that a video card is plugged in, but that no EFI driver or OS driver has been loaded for that video card, such as may occur after a shut-down of the system, removal of an old video card, and insertion of the new card. Upon subsequent reboot, the OS may discover the new card.

If no driver is needed, the OS may continue to operate normally. If a driver is needed, the OS may launch an agent or client for retrieving the needed driver from a remote data processing system, such as remote system 260. That agent or client may be represented as an RDT client 330. In the example embodiment, RDT client 330 executes within runtime environment 322 along with other programs which support remote driver transport, such as an HTTP process 332. RDT client 330 may include or call a web browser or a similar program.

At block 806, RDT client 330 may retrieve a predetermined XML document 30 from remote system 260. RDT client 330 may locate XML document 30 based on data from an EFI system table in the pre-boot or EFI VM environment, for example. In one embodiment, a system table such as an EFI configuration table may associate globally unique identifiers (GUIDs) for devices and controllers in the system with URLs that point to corresponding drivers. In particular, in one embodiment, an EFI configuration table contains a set of GUID/pointer pairs in a data structure with a form such as (GUID, Ptr), and each pointer references a list of data items in the following 3-tuple form: <URL, EFI_DRIVER_FILE_NAME, Version>. The URL data item may identify a directory that contains various EFI drivers for controllers or components that may be supported for processing system 100, and the file name and version may identify a particular driver or version of a driver within that directory. For instance, a company named Acme may sell a platform that includes a console controller such as a video controller, and an EFI system table in that platform may link a GUID for that console controller, such as "ConOut," with the location of the latest corresponding driver, such as "www.acme.com/support/platformX/EbcDrivers/video_driver_file_name" (with the URL possibly including the prefix "http://").

In one embodiment, the same driver may be downloaded in the pre-OS environment and in the OS runtime. In an alternative embodiment, the different environments may download and use different drivers.

After retrieving the XML document, RDT client 330 may use an XML parser 334 to locate a predetermined configuration code element within the XML document, such as an <EBC> element, and to extract the content from that element, as shown at block 808. RDT client 330 may then use a translation module 336 to translate that content from a text string into an image in EBC format, as shown at block 810.

RDT client 330 may then determine whether the EBC image is a valid PE image, as indicated at block 820. If the EBC image in not valid, an error message may be generated and RDT client 330 may be closed, as indicated at blocks 822 and 846. The process may then return to block 802. However, if the EBC image is valid, RDT client 330 may determine whether an EFI virtual machine (VM) is available from runtime environment 322, as indicated at block 830. If an EFI VM is not available, RDT client 330 may cause processing system 100 to start an EFI VM 340, as shown at block 832. This functionality could be deployed on systems that use EFI firmware in the pre-OS state, as well as systems that do not.

Once EFI VM 340 has been launched (or determined to be already available), RDT client 330 may use an OS service to load the EBC image into an appropriate portion of RAM 280, and may invoke an EBC interpreter 344 within EFI VM 340 to interpret and execute the configuration code within the EBC image, as show at block 840 and 842. Once RDT client 330 has passed the EBC image to EBC interpreter 344, the driver may be considered loaded, instantiated, or exucted, for example as depicted by video driver 394 in FIG. 5. The OS may then close RDT client 330, as shown at block 846.

The process may then return to block 802, with various operations being reiterated as necessary. For instance, additional drivers may be retrieved using RDT client 330 and loaded using EFI VM 340. Thus, RDT client 330 may retrieve drivers or other configuration code encapsulated within XML files, and may load those drivers from runtime environment 322. Once drivers have been loaded, they may be used by the OS. For example, after loading a UGA driver from an EBC image, the OS may call into the EFI UGA UGA_IO protocol and request a screen mode change. The requested change may be executed by the UGA driver. When the UGA driver needs to access a hardware memory-mapped I/O or I/O resource, the UGA driver may pass the transaction into the native OS I/O manager so that memory and I/O safety policies can be maintained prior to committing the access. By contrast, in a pre-OS environment, I/O transactions may be committed by native EFI code, without any OS I/O manager involved in the transaction.

A remote system may provide XML files with EBC images via a web service, possibly as part of a web page. According to one embodiment, a target system may obtain XML documents with EBC images from the remote system via a network. According to another embodiment, a system may obtain XML documents with EBC images from local storage such as a hard drive, as an alternative to or in conjunction with obtaining EBC images from a network.

In one embodiment, a target processing system may use an OS that includes an EBC interpreter, such as Linux for example. In accordance with the present disclosure, a data processing system may be able to use local or remote EBC drivers running in an OS-virtualized EFI environment. In one embodiment, the present disclosure allows for generalized, network-downloaded firmware services whose safety properties are enforced via an OS EFI VM to provide OS runtime device abstraction.

By contrast, for a legacy system to use firmware services, the system may utilize call backs into legacy BIOS. Legacy BIOS calls are dangerous and entail virtual real mode (V86) machinations or heavy weight mode switches. For example, the OS's graphics drivers may invoke video services through the Int10h BIOS interface. Alternatively, a system may use EFI runtime services or system abstraction layer procedures (SAL_PROCs), although such services or procedures may be limited in capability and/or may not provide generalized device abstraction.

In addition, a legacy system may only be able to utilize EFI drivers transported via an adapter card. Furthermore, if a driver for such a system is needed in the OS runtime, the pre-boot firmware may need to handoff the driver to the OS. However, according to the present disclosure, the OS runtime may obtain a network-borne EBC image using an industry standard XML format with an EBC-specific schema.

In light of the principles and example embodiments described and illustrated herein, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, it will be apparent to those of ordinary skill in the art that numerous modifications to that process could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered. For instance, many features described above with regard to the OS runtime process may be provided in connection with the pre-OS process, and vice versa.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In addition, the invention is not limited to any particular hardware architecture, but may be practiced in association with a wide variety of architectures, including 32-bit architectures and 64-bit architectures.

In addition, some embodiments of the invention may include XML documents that contain EBC images in accordance with the present disclosure. Other embodiments may include instructions for obtaining such documents. Additional embodiments may include processing systems which retrieve and/or use XML documents that include EBC images, as well as processing systems which provide such documents.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
   extracting an extensible framework interface (EFI) byte code image from an extensible markup language (XML) document;
   executing the EFI byte code (EBC) image on a processing system;
   decoding the EBC image from a text-based encoding to a binary image; and
   utilizing an EFI virtual machine to interpret the EBC image.

2. A method according to claim 1, further comprising:
   retrieving the XML document from a remote processing system to the processing system.

3. A method according to claim 1, wherein
   the EBC image comprises an EFI driver; and
   the operation of executing the EBC image comprises loading the EFI driver in a pre-operating system environment of the processing system.

4. A method according to claim 1, wherein
   the EBC image comprises an EFI driver; and
   the operation of executing the EBC image comprises loading the EFI driver in an operating system runtime environment of the processing system.

5. A method according to claim 1, further comprising:
   obtaining the XML document from local data storage.

6. An apparatus comprising:
   a tangible, machine accessible medium; and
   instructions encoded in the machine accessible medium, wherein the instructions, when executed by a processing system, cause the processing system to perform operations comprising:
   extracting an extensible framework interface (EFI) byte code image from an extensible markup language (XML) document;
   executing the EFI byte code (EBC) image;
   decoding the EBC image from a text-based encoding to a binary image; and
   utilizing an EFI virtual machine to interpret the EBC image.

7. An apparatus according to claim 6, wherein the operations performed by the instructions further comprise:
   retrieving the XML document from a remote processing system.

8. An apparatus according to claim 6, wherein:
   the EBC image comprises an EFI driver; and
   the operation of executing the EBC image comprises loading the EFI driver in a pre-operating system environment of the processing system.

9. An apparatus according to claim 6, wherein:
   the EBC image comprises an EFI driver; and
   the operation of executing the EBC image comprises loading the EFI driver in an operating system runtime environment of the processing system.

10. An apparatus according to claim 6, wherein the operations performed by the instructions further comprise:
    obtaining the XML document from local data storage.

11. An apparatus according to claim 6, further comprising:
    a processor communicatively coupled to the machine accessible medium, the processor to execute the instructions encoded in the machine accessible medium.

* * * * *